United States Patent Office 3,646,022
Patented Feb. 29, 1972

3,646,022
FIVE AND SIX MEMBERED HETERO S AND HETERO N FUSED RING COMPOUNDS
Wilfried Graf, Binningen, Basel-Land, and Erich Schmid, Basel, Switzerland, assignors to Ciba-Geigy Corporation
No Drawing. Continuation-in-part of application Ser. No. 429,906, Feb. 2, 1965. This application June 7, 1968, Ser. No. 735,179
Claims priority, application Switzerland, Feb. 5, 1964, 1,388/64; Feb. 11, 1964, 1,629/64
Int. Cl. C07d 91/04, 93/08
U.S. Cl. 260—243 R
14 Claims

ABSTRACT OF THE DISCLOSURE

Heterocyclic compounds having at least two rings, each having 5 to 6 ring members and fused through a common nitrogen and a carbon atom which are adjacent and having a sulfur atom in one ring in a position adjacent to the carbon atom common to both rings, a keto group in the other ring in a position adjacent to the nitrogen atom common to both rings and an aryl substituent on the carbon atom common to both rings are anti-inflammatory and CNS active agents.

CROSS REFERENCE

This is a continuation-in-part of copending application Ser. No. 429,906, filed Feb. 2, 1965 now abandoned.

DETAILED DESCRIPTION

The present invention concerns processes for the production of new condensed heterocyclic compounds as well as the new compounds obtained by this process.

The compounds of the present invention are represented by the general formula:

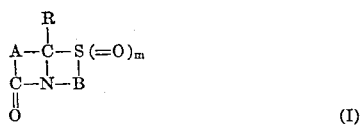

(I)

wherein

R is aryl optionally substituted by lower alkyl, lower alkoxy, lower alkylthio, lower alkylthio, lower alkylsulfonyl, lower alkylamino, di-lower alkylamino, lower alkanoylamino, lower alkylsulfamoyl, di-lower alkylsulfamoyl, hydroxyl, amino, sulfo, sulfamoyl, trifluoromethyl, or halogen, each of A and B, independently of the other is (a) ethylene or trimethyl optionally substituted by lower alkyl and/or phenyl, (b) o-phenylene or (c) o-benzylene, the benzene nucleus of o-phenylene or o-benzylene being optionally substituted by lower alkyl, lower alkoxy and/ or halogen; and $m$ is 0 or 1.

The above compounds can be first divided into two distinct classes: those wherein the sulfur atom of the heterocyclic system is unoxidized ($m=0$) and those wherein the sulfur atom is oxidized ($m=1$).

A second subdivision within each of these two classes can be noted for those compounds on one hand wherein A and B are essentially aliphatic in nature, and the compounds are bicyclic; e.g., A and B are ethylene or trimethylene including alkyl and phenyl substituted ethylene and trimethylene, and for those compounds on the other hand wherein A and B are essentially aromatic in nature and the compounds are tricyclic or tetracyclic; e.g., one or both of A and B is o-phenylene or o-benzylene.

The compounds of the present invention wherein $m=0$ are obtained by allowing a $\gamma$ or $\delta$-ketocarboxylic acid or an acid chloride, acid bromide, lower alkyl ester or mixed anhydride thereof to react with a mercaptoamine. Thus a compound of general Formula II:

(II)

or the tautomeric equivalent thereof of general Formula III:

(III)

wherein X is hydroxyl, chloro, bromo, a lower alkoxy, or lower alkanoyloxy (particularly acetoxy)
and R and A are as defined above for Formula I, which is allowed to react with a compound of the general Formula IV:

$$H_2N-B-SH \quad (IV)$$

wherein B is as defined above for Formula I.

In some instances, two reaction steps can be observed in the performance of the process according to the invention.

First an intermediate product of general Formula V:

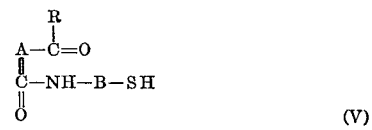

(V)

is formed which in some cases is wholly or partially in the tautomeric form corresponding to general Formula VI

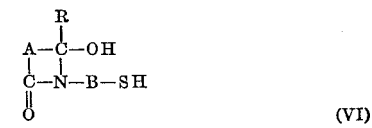

(VI)

in which R, A and B are as defined above for Formula I. In the formation of the compound of Formula V or VI a compound of the composition X—H; i.e., water, hydrogen halide, a lower alkanol or a lower alkanoic acid is split off. An end product of general Formula I is formed therefrom by splitting off water under the reaction conditions given above. Thus, the present invention also includes the production of these end products from intermediate products of the general Formulae V and/or VI.

In the practice of this process, a mercapto amine of the general Formula IV is heated, in the absence or presence of a solvent with which water azeotropically distills, such as toluene, chlorobenzene, xylene, o-chlorotoluene, o-dichlorobenzene, amyl alcohol, at temperatures of about 100–250° with a ketocarboxylic acid or a derivative thereof corresponding to general Formulae II and/or III. The condensation according to the invention is performed through the splitting off of an equimolar amount of the compound H—X and water and, if desired, can be promoted by agents which split off water such as; e.g., zinc chloride or magnesium perchlorate or by azeotropically distilling off the reaction water or the liberated alkanol or the liberated acetic acid.

A modification of the procedure for the production of compounds of the general Formula I consists in subjecting reactive esters of an alcohol of the general Formula VII:

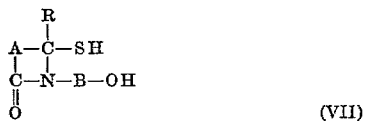

(VII)

wherein A, B and R are as defined above, to conditions by which acid is split off. Such reactive esters can be the sulfates, sulfonates, particularly arylsulfonates, such as the benzenesulfonate or the p-toluenesulfonate, or halides; e.g., the chloride or bromide. The alkali and alkali earth metal carbonates, acetates, alcoholates, hydroxides and sulfides or organic bases, particularly triethylamine or pyridine, can be used as agents for the removal of acids. Alcohols or aromatic hydrocarbons with a boiling point higher than 100°, chlorinated hydrocarbons, pyridine or dimethylformamide are suitable solvents. The reaction temperature is preferably between 80 and 180° C.

The reactive esters suitable as starting materials can be produced from the corresponding esters of compounds of the Formula VIII:

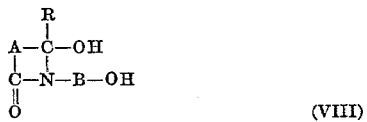

(VIII)

wherein A, B and R are as defined above by treatment with hydrogen sulfide in the presence of acid.

The compounds of the present invention of Formula I wherein $m=1$ are obtained from the corresponding compounds of Formula I wherein $m=0$ through oxidation. This oxidation is accomplished by treating a compound of the general Formula I wherein $m=0$ with hydrogen peroxide or an agent generating hydrogen peroxide. The reaction is carried out in aqueous-alcoholic solution, preferably in the presence of acid.

In the compounds of the general Formula I and in the corresponding starting materials, R is, for example, phenyl, o-, m- and p-tolyl, 2,3- 2,4-, 3,4-, 2,5- and 2,6-xylyl, o-, m- and p-ethylphenyl, p-propylphenyl, p-isopropylphenyl, p-butylphenyl, p-isobutylphenyl, p-tert.-butylphenyl, $\alpha$-phenyl-p-tolyl, p-biphenylyl, o-, m- and p-fluorophenyl, o-, m- and p-chlorophenyl, o-, m- and p-bromophenyl, 2,4-dichlorophenyl, 2,5-dichlorophenyl, 3,4-dichlorophenyl, 2-methyl-4-chlorophenyl, 2-methyl-5-chlorophenyl, $\alpha,\alpha,\alpha$-trifluoro-m-tolyl (i.e., m-trifluoromethylphenyl) $\alpha,\alpha,\alpha$-trifluoro-p-tolyl (i.e., p-trifluoromethylphenyl), 2,4,6-trimethylphenyl, m-methoxyphenyl, p-methoxyphenyl, m-ethoxyphenyl, p-ethoxyphenyl, p-methylthiophenyl, o-hydroxyphenyl, m-hydroxyphenyl, p-hydroxyphenyl, 2-hydroxy-4-methylphenyl, 2-hydroxy-5-methylphenyl, p-methylsulfonylphenyl, p-acetamidophenyl, m-acetamidophenyl, m-aminophenyl, 3-acetamido-4-chlorophenyl, 3-amino-4-chlorophenyl, 2-hydroxy-4-chlorophenyl, 2-hydroxy-5-chlorophenyl, 2-hydroxy-5-methoxyphenyl, 3-sulfamoyl-4-chlorophenyl, m-dimethylsulfamoylphenyl, 1-naphthyl, 2-naphthyl.

A is, for example, ethylene, trimethylene, phenylethylene, 2,2-dimethyltrimethylene, 1,2-diphenylethylene, 1,2-diphenyltrimethylene, o-phenylene, 4-methyl-o-phenylene, 3-chloro-o-phenylene, 4-chloro-o-phenylene, 3,6-dichloro-o-phenylene, 3,4,5,6-tetrachloro-o-phenylene, 4-methoxy-o-phenylene or o-benzylene.

B is, for example, ethylene, trimethylene, methylethylene, 1,1-dimethylethylene, 1,2-dimethylethylene, ethylethylene, 2,2-dimethyltrimethylene, o-phenylene, 4-methyl-o-phenylene, 3-chloro-o-phenylene, 4-chloro-o-phenylene, 4-methoxy-o-phenylene or o-benzylene.

The non-symmetrical divalent radicals listed under A and B can actually be present in the molecule of the end product in the various possible arrangements.

Many of the compounds employed as starting materials are known or can be produced by generally known processes. Examples of compounds of general Formulae II and III are:

3-benzoylpropionic acid,
3-(m-fluorobenzoyl)propionic acid,
3-(p-fluorobenzoyl)propionic acid,
3-(m-chlorobenzoyl)propionic acid,
3-(p-chlorobenzoyl)propionic acid,
3-(p-bromobenzoyl)propionic acid,
3-(m-toluoyl)propionic acid,
3-(p-toluoyl)propionic acid,
3-(p-ethylbenzoyl)propionic acid,
3-(p-isopropylbenzoyl)propionic acid;
3-(p-tert.butylbenzoyl)propionic acid,
3-($\alpha,\alpha,\alpha$-trifluoro-m-toluoyl)propionic acid [i.e., 3-(m-trifluoromethylbenzoyl)propionic acid],
3-salicyloylpropionic acid,
3-(m-hydroxybenzoyl)propionic acid,
3-(p-anisoyl)propionic acid,
2-phenyl-3-benzoylpropionic acid,
2-phenyl-3-(p-anisoyl)propionic acid,
4-benzoylbutyric acid,
3,3-dimethyl-4-benzoylbutyric acid,
3,3-dimethyl-4-(p-chlorobenzoyl)butyric acid,
2,3-diphenyl-4-benzoylbutyric acid,
2,3-diphenyl-4-(p-anisoyl)butyric acid,
o-benzoylbenzoic acid,
o-(m'-fluorobenzoyl)benzoic acid,
o-(p'-fluorobenzoyl)benzoic acid,
o-(m'-chlorobenzoyl)benzoic acid,
o-(p'-chlorobenzoyl)benzoic acid,
o-(p'-bromobenzoyl)benzoic acid,
o-(m'-toluoyl)benzoic acid,
o-(p'-toluoyl)benzoic acid,
o-(p'-ethylbenzoyl)benzoic acid,
o-(p'-isopropylbenzoyl)benzoic acid,
o-(p'-tert.butylbenzoyl)benzoic acid,
o-($\alpha,\alpha,\alpha$-trifluoro-m'-toluoyl)benzoic acid [i.e., o-(m-trifluoromethylbenzoyl)benzoic acid],
o-($\alpha,\alpha,\alpha$-trifluoro-p'-toluoyl)benzoic acid, [i.e., o-(p-trifluoromethylbenzoyl)benzoic acid],
o-salicyloylbenzoic acid,
o-(m'-hydroxybenzoyl)benzoic acid,
o-(p'-hydroxybenzoyl)benzoic acid;
o-(m'-anisoyl)benzoic acid,
o-(p'-anisoyl)benzoic acid,
o-(p'-ethoxybenzoyl)benzoic acid,
o-(p'-methylthiobenzoyl)benzoic acid,
o-(p'-methylsulfonylbenzoyl)benzoic acid,
o-(m'-aminobenzoyl)benzoic acid,
o-(m'-acetamidobenzoyl)benzoic acid,
o-(p'-acetamidobenzoyl)benzoic acid,
o-(m'-dimethylsulfamoylbenzoyl)benzoic acid,
o-(3,4-dichlorobenzoyl)benzoic acid,
o-(2,4-dimethylbenzoyl)benzoic acid,
o-(2,5-dimethylbenzoyl)benzoic acid,
o-(3,4-dimethylbenzoyl)benzoic acid,
o-(5-chlorosalicyloyl)benzoic acid,
o-(2-hydroxy-5-methylbenzoyl)benzoic acid,
o-(2-hydroxy-5-methoxy benzoyl)benzoic acid,
o-(3-amino-4-chlorobenzoyl)benzoic acid,
o-(3-acetamido)-4-chlorobenzoyl)benzoic acid,
o-(3-sulfamoyl-4-chlorobenzoyl)benzoic acid,
o-(2,4,6-trimethylbenzoyl)benzoic acid,
2-benzoyl-3-chlorobenzoic acid,
2-benzoyl-3,4,5,6-tetrachlorobenzoic acid,
2-(p-chlorobenzoyl)-3-chlorobenzoic acid,
2-(p-chlorobenzoyl)-3,4,5,6-tetrachlorobenzoic acid,
2-naphthoylbenzoic acid,
o-phenacylbenzoic acid,
o-benzoylphenylacetic acid,
o-benzoylbenzoic acid methyl ester,
3-chloro-3-phenylphthalide,
3-methoxy-3-phenylphthalide,
3-acetoxy-3-phenylphthalide, As starting materials of the general Formula IV can be mentioned: 2-aminoethane thiol, 1-amino-2-propane thiol, 2-amino-1-propane thiol, 1-amino-2-methyl-2-propane thiol, 1-amino-2-butane thiol, 2-amino-3-butane thiol, o-aminobenzene thiol (o-aminothiophenol), 2-amino-4-chlorobenzene thiol, 3-amino-1-propane thiol, 2,2-dimethyl-3-amino-1-propane thiol, o-amino-α-toluene thiol (o-aminobenzylmercaptan).

The new compounds produced, generally with good yields, by this prcess are distinguished by valuable pharmacological properties. In particular, such compounds have anti-inflammatory, anaesthesia-potentiating, anticonvulsive and analgetic activity with, at the same time, relatively slight toxicity. The anti-inflammatory activity of the compounds of the general Formula I is seen, for example, in tests on animals having peritonitis induced by formalin. On administration of 200 mg. per kg. body weight per os to rats, for example, 9b-phenyl-2,3-dihydro-thiazolo[2,3-a]isoindol-5(9bH)-one, 9b - (p-tolyl)-2,3-dihydro-thiazol[2,3-a]isoindol - 5(9bH) - one and 9b - (p-methoxyphenyl - 2,3 - dihydro - thiazolo[2,3-a]isoindol-5(9bH)-one caused a reduction of exudation of more than 45%, compared with control animals. Similar favorable results are also obtained, for example, in tests involving edema of the rat's paw induced by formalin and albumin, in experimental granuloma, and in pyrexia in rats.

Therapeutical administration of the compounds of general Formula I is mainly oral or rectal. The compounds can also be administered parenterally in the form of aqueous dispersions produced with the aid of solubility promoters and/or emulsifying agents.

Compounds of the general Formula I, in particular those in which R is substituted by hydroxyl or amino groups, can also be used as intermediate products, for example, for the production of other pharmacologically valuable substances.

Preferred anti-inflammatory agents according to the invention are those of the general formula

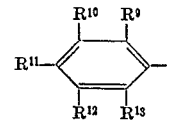

(IX)

wherein

R is phenyl, lower alkylphenyl, benzylphenyl, phenylphenyl (biphenylyl), fluorophenyl, bromophenyl, chlorophenyl, trifluoromethylphenyl, lower alkoxyphenyl, lower alkylthiophenyl, hydroxyphenyl, lower alkylsulfonylphenyl, lower alkanoylaminophenyl, aminophenyl, sulfamylphenyl, N-lower alkyl sulfamylphenyl and naphthyl, each of A and B is α,ω-alkylene, lower alkyl-substituted α,ω-alkylene, phenyl-substituted α,ω-alkylene, and o-phenylene, "alkylene" being of from 2 to 3 carbon atoms and "o-phenylene" being optionally substituted by lower alkyl, lower alkoxy and/or fluoro, chloro or bromo; and m is 0 or 1.

Within the scope of the present invention are obvious extensions and/or modifications of the foregoing compounds. For example those compounds of the present invention wherein m is 0 and A and B are essentially aliphatic in nature can be depicted by the following structure and definition, which are substantially equivalent to the structure and definition associated with general Formula I:

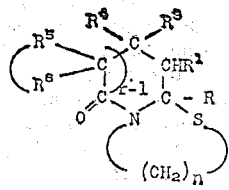

wherein

R represents aryl or ar(lower)alkyl; the aryl and the ar- of ar(lower)alkyl being of the formula

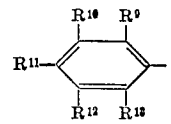

each of $R^1$, $R^3$, $R^4$, $R^5$ and $R^6$ is a member of the group hydrogen, straight chain(lower)alkyl, aryl or ar(lower)alkyl; or together with the member bound to the same carbon atom, polymethylene having from 4 to 6 carbon atoms; the aryl and the ar- of ar(lower)alkyl being of the formula

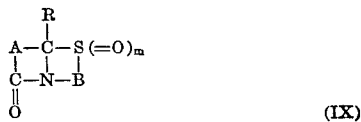

there being at most three of the members other than hydrogen bound to adjacent carbon atoms; a plurality of polymethylene groups not being bound to adjacent carbon atoms; and there being a maximum of four members of R, $R^1$, $R^3$, $R^4$, $R^5$ and $R^6$ other than hydrogen;

each $R^9$, $R^{10}$, $R^{11}$, $R^{12}$ and $R^{13}$ is a member of the group hydrogen, chloro, fluoro, bromo, lower alkyl, lower alkoxy, trifluoromethyl or lower alkylthio; or together with the member on the adjacent ring carbon atom, methylenedioxy; at least one of $R^9$, $R^{10}$, $R^{11}$, $R^{12}$ and $R^{13}$ being hydrogen; a plurality of trifluoromethyl groups not being bound to adjacent carbon atoms; each of $R^9$ and $R^{13}$ of aryl and ar(lower)alkyl groups being hydrogen in a plurality of such groups bound to the same carbon atoms; and each $R^9$ of aryl and ar(lower)alkyl groups being hydrogen in a plurality of such groups bound to adjacent carbon atoms;

r represents 1 or 2; and n represents 2 or 3.

Four distinct heterocyclic systems falling within Formula I are also embraced by Formula X. These are as follows:

(1) 2,3,7,7a - tetrahydro-pyrrolo[2,1-b]thiazol-5(6H)-one (alternatively named as 2,3,5,6,7,7a-hexahydro-pyrrolo[2,1-6]thiazol-5-one), i.e., those compounds of Formula I where each of A and B is ethylene or those compounds of Formula X wherein r is 1 and n is 2. This system, exclusive of substitution, can be represented as follows:

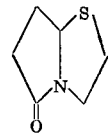

(2) Tetrahydro-2H-pyrrolo[2,1-b][1,3]thiazin-6(7H)-one (alternatively named as 3,4,6,7,8,8a-hexahydro-2H-pyrrolo[2,1-b][1,3]thiazin-6-one); i.e., those compounds of Formula I wherein A is ethylene and B is trimethylene or those components of Formula X wherein r is 1 and n is 3. This system, exclusive of substitution, can be represented as follows:

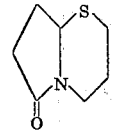

(3) Hexahydro - 5H - thiazolo[3,2-a]pyridin - 5 - one (alternatively named as 2,3,6,7,8,8a-hexahydro-5H-thiazolo[3,2-a]-pyridin-5-one); i.e., those compounds of Formula I wherein A is trimethylene and B is ethylene or those compounds of Formula X wherein r is 2 and n is 2.

This system, exclusive of substitution, may be represented as follows:

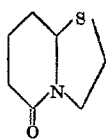

(4) Hexahydro - 2H,6H - pyrido[2,1-b][1,3]thiazin-6-one (alternatively named as 2,3,7,8,9,9a-hexahydro-4H,6H-pyrido[2,1-b][1,3]thiazin-6-one); i.e., those compounds of Formula I wherein each of A and B is trimethylene or those compounds of Formula X wherein $r$ is 2 and $n$ is 3. This system, exclusive of substitution, may be represented as follows:

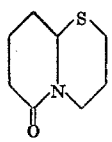

A further presentation of the compounds of the present invention is depicted by the formula:

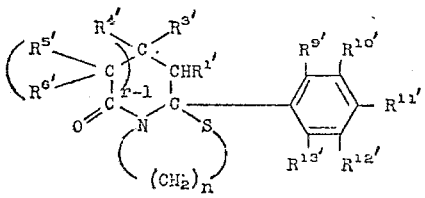

wherein each of $R^{1'}$, $R^{3'}$, $R^{4'}$, $R^{5'}$ and $R^{6'}$ is hydrogen, lower alkyl or phenyl, there being a maximum of four members of $R^{1'}$, $R^{3'}$, $R^{4'}$, $R^{5'}$ and $R^{6'}$ other than hydrogen each of $R^{9'}$, $R^{10'}$, $R^{11'}$, $R^{12'}$ and $R^{13'}$ is hydrogen, chloro, fluoro, lower alkyl, lower alkoxy or trifluoromethyl, at least one of $R^{9'}$, $R^{10'}$, $R^{11'}$, $R^{12'}$ and $R^{13'}$ being hydrogen; a plurality of trifluoromethyl groups not being bound to adjacent carbon atoms;

$r$ is 1 or 2 and
$n$ is 2 or 3.

The following examples will serve to further typify the nature of this invention without being a limitation on the scope thereof.

EXAMPLE 1

22.6 parts of o-benzoyl-benzoic acid and 9.4 parts of 2-amino-ethane thiol are kept for 1 hour at 150° in an open flask. After cooling, the crude product is recrystallized from benzene. 9b-phenyl-2,3-dihydro-thiazolo[2,3-a]isoindole-5(9bH)-one of the formula

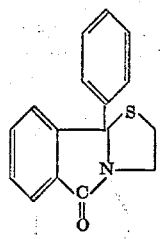

is so obtained. M.P. 104–106°.

The following compounds are obtained by the same procedure from the corresponding varied starting materials:

(a) 9b - (p - methoxyphenyl) - 2,3 - dihydro - thiazolo[2,3-a]isoindol - 5(9bH) - one, M.P. 86–88°, from o-(p' - anisoyl) - benzoic acid and 2-amino-ethane thiol;

(b) 9b - (p - chlorophenyl) - 2,3 - dihydro-thiazolo[2,3-a]isoindol-5(9bH)-one, M.P. 125–129°;
(c) 9b - (p - bromophenyl) - 2,3 - dihydro-thiazolo[2,3-a]isoindol-5(9bH)-one, M.P. 154–156°;
(d) 9b - (p - fluorophenyl) - 2,3 - dihydro - thiazolo-[2,3-a]isoindol - 5(9bH) - one, B.P. 190–200°/0.005 Torr, amorphous, and
(e) 9b - (p - tolyl) - 2,3 - dihydro - thiazolo[2,3-a]isoindol - 5(9bH) - one, M.P. 85–86°.
(f) 9b - (p-methylthio - phenyl) - 2,3 - dihydro-thiazolo-[2,3-a]isoindol - 5(9bH) - one from o-(p'-methylthio-benzoyl)-benzoic acid and 2-amino-ethanethiol.
(g) 9b - (m - dimethylsulfamyl - phenyl) - 2,3 - dihydro-thiazolo[2,3-a]isoindol-5(9bH)-one.
(h) 9b - (α - naphthyl) - 2,3 - dihydro - thiazolo[2,3-a]-isoindol - 5(9bH) - one.
(i) 3 - ethyl - 9b - phenyl - 2,3 - dihydro - thiazolo[2,3-a]isoindol-5(9bH)-one.
(j) 3 - methyl - 9b - (m - sulfamyl - phenyl) - 2,3 - dihydro-thiazolo[2,3-a]isoindol-5(9bH)-one.
(k) 9b - (p - phenyl-phenyl)-2,3-dihydro-thiazolo[2,3-a]isoindol-5(9bH)-one.

EXAMPLE 2

26.2 parts of o-(p'-chlorobenzoyl)-benzoic acid and 12.8 parts of o-aminobenzene thiol(o-aminothiophenol) are heated to 200° and kept at this temperature for 1 hour. After cooling, the crude product is recrystallized from ethyl acetate. In this way 4b-(p-chlorophenyl)isoindolo[2,3-b]-benzothiazol-11(4bH)-one of the formula

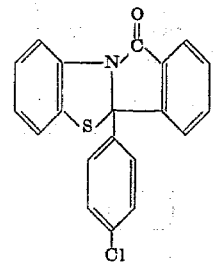

is obtained. M.P. 200–201°.

The following compounds are obtained by the same procedure from the correspondingly varied starting materials:

(a) 4b-(p-chloro-phenyl)-8-methyl-isoindolo[2,3,b]benzothiazol-11[4bH]-one,
(b) 4b-phenyl-7-chloro-isoindolo[2,3-b]benzothiazol-11(4bH)-one,
(c) 4b-(m-amino-phenyl)-isoindolo[2,3-b]benzothiazol-11(4bH)-one,
(d) 4b-(m-acetylamino-phenyl)-isoindolo[2,3-b]benzothiazol-11(4bH)-one,
(e) 4b-phenyl-7-bromo-isoindolo[2,3-b]benzothiazol-11(4bH)-one,
(f) 4b-phenyl-3-fluoro-isoindolo[2,3-b]benzothiazol-11(4bH)-one.

EXAMPLE 3

24.2 parts of o-(m'-hydroxybenzoyl)-benzoic acid and 7.7 parts of 2-amino-ethane thiol are boiled with 200 parts by volume of chlorobenzene. Chlorobenzene is allowed to distill off slowly with the reaction water until the condensation point has risen to 130° after about 1–2 hours. After cooling, the product is precipitated by the addition of petroleum ether and it is then recrystallized from methanol. In this way, 9b-(m-hydroxyphenyl) - 2,3 - dihydro-thiazolo[2,3-a]isoindol-5(9bH)-one of the formula is obtained

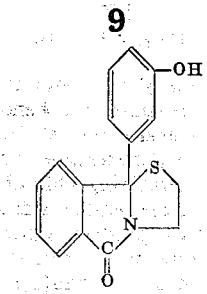

M.P. 185–187°.

The following compounds are produced in an analogous manner:
(a) 9b-(m-chlorophenyl)-2,3-dihydro-thiazolo[2,3-a]isoindol-5(9bH)-one, M.P. 134–136°;
(b) 9b-(α,α,α-trifluoro-o-tolyl)-2,3-dihydro-thiazolo[2,3-a]isoindol-5(9bH)-one, B.P. 200–210°/0.02 torr, amorphous;
(c) 9b-(m-methoxyphenyl)2,3-dihydro-thiazolo[2,3-a]isoindol-5(9bH)-one, M.P. 140–143°;
(d) 9b-(m-tolyl)-2,3-dihydro-thiazolo[2,3-a]isoindol-5(9bH)-one, M.P. 100–103°;
(e) 9b-(2',4'-xylyl)-2,3-dihydro-thiazolo[2,3-a]isoindol-5(9bH)-one, M.P. 122–124°;
(f) 9b-(p-hydroxyphenyl)-2,3-dihydro-thiazolo[2,3-a]isoindol-5(9bH)-one, M.P. 230–232°;
(g) 9b-(p-ethylphenyl)-2,3-dihydro-thiazolo[2,3-a]isoindol-5(9bH)-one, B.P. 210–220°/0.025 torr;
(h) 9b-(p-ethoxyphenyl)-2,3-dihydro-thiazolo[2,3-a]isoindol-5(9bH)-one, M.P. 100–101.5°;
(i) 9b-(m-fluorophenyl)-2,3-dihydro-thiazolo[2,3-a]isoindol-5(9bH)-one, M.P. 92–96°;
(j) 9b-(α,α,α-trifluoro-m-tolyl)-2,3-dihydro-thiazolo[2,3-a]isoindol-5(9bH)-one, M.P. 100–103°;
(k) 9b-(3',4'-xylyl)-2,3-dihydro-thiazolo[2,3-a]isoindol-5(9bH)-one, M.P. 153–155°, and
(l) 9b-(2',5'-xylyl)-2,3-dihydro-thiazolo[2,3-a]isoindol-5(9bH)-one, M.P. 100–101.5°.

EXAMPLE 4

30.4 parts of o-(p'-methylsulfonylbenzoyl)-benzoic acid and 8.1 parts of 2-amino-ethane thiol are boiled with 300 parts by volume of p-chlorotoluene. The reaction water formed and p-chlorotoluene are distilled off azeotropically until the boiling point of 160° is attained after about 2 hours. The remaining chlorotoluene is distilled off in vacuo. The dark residue is boiled down several times with benzene. The extracts are evaporated to dryness and the crude product so obtained is recrystallized several times from methanol. In this way, 9b-(p-methylsulfonylphenyl) - 2,3 - dihydro-thiazolo[2,3-a]isoindol-5(9bH)-one is obtained of the formula

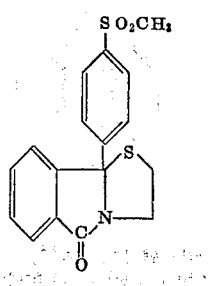

M.P. 130–133°.

In a similar fashion
(a) 9b-(3',4'-dichlorophenyl)-2,3-dihydro-thiazolo[2,3-a]isoindol-5(9bH)-one, M.P. 134–135°
(b) 9b-(p-benzylphenyl)-2,3-dihydro-thiazolo[2,3-a]isoindol-5(9bH)-one
are obtained from the correspondingly varied starting materials by the procedure described in Example 4.

EXAMPLE 5

22.6 parts of o-benzoyl-benzoic acid, 9.1 parts of 3-amino-1-propane thiol and 100 parts by volume of chlorobenzene are boiled. The reaction water and chlorobenzene are distilled off azeotropically until, about 6 hours, the boiling point of the pure chlorobenzene is attained. The reaction mixture is then evaporated to dryness, the residue is dissolved in benzene and washed with sodium bicarbonate solution. On concentrating the benzene solution, the 10b-phenyl - 3,4 - dihydro-2H-[1,3]thiazino[2,3-a]isoindol - 6(10bH) - one of the formula

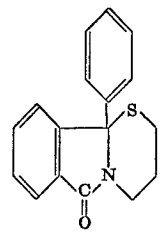

crystallizes. M.P. 163–165°.

The following compounds are produced in an analogous manner:
(a) 10b-(p-chlorophenyl)-3,4-dihydro-2H-[1,3]thiazino[2,3-a]isoindol-6(10bH)-one, M.P. 125–127°;
(b) 10b-(p-methoxyphenyl)-3,4-dihydro-2H-[1,3]thiazino[2,3-a]isoindol-6(10bH)-one, M.P. 117–119°,
(c) 10b-(α,α,α-trifluoro-m-tolyl)-3,4-dihydro-2H[1,3]thiazino[2,3-a]isoindol-6(10bH)-one, M.P. 152–154°
(d) 9-chloro-10b-phenyl-3,4-dihydro-2H[1,3]thiazino[2,3-a]isoindol-6(10bH)-one,
(e) 8-ethyl-10b-phenyl-3,4-dihydro-2H[1,3]thiazino[2,3-a]isoindol-6(10bH)-one, and
(f) 9-methoxy-10b-phenyl-3,4-dihydro-2H[1,3]thiazino[2,3-a]isoindol-6(10bH)-one.

EXAMPLE 6

17.8 parts of 3-benzoyl-propionic acid and 8 parts of 2-amino-ethane thiol are heated for 2 hours at 150°. The residue is dissolved in ethyl acetate, the solution is filtered over charcoal and the residue is concentrated. On recrystallizing from benzene, pure 7a-phenyl-2,3,7,7a-tetrahydro-pyrrolo[2,1-b]thiazol 5(6H)-one of the formula

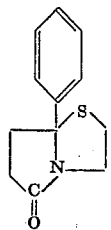

is obtained, M.P. 73°. This compound can be alternatively described as 7a - phenyl - 2,3,5,6,7,7a - hexahydro-pyrrolo[2,1-b]thiazol-5-one.

The following compounds are obtained in an analogous manner:
(a) 7a-(p-methoxyphenyl)-2,3,7,7a-tetrahydro-pyrrolo[2,1-b]thiazol-5(6H)-one, M.P. 104°;
(b) 6,7a-diphenyl-2,3,7,7a-tetrahydro-pyrrolo[2,1-b]thiazol-5(6H)-one, M.P. 107°,
(c) 7a-(o-hydroxyphenyl)-2,3,7,7a-tetrahydro-pyrrolo[2,1-b]thiazol-5(6H)-one, M.P. 177°,
(d) 3-(p-anisyl)-7a-phenyl-2,3,7,7a-tetrahydro-pyrrolo[2,1-b]thiazol-5(6H)-one,
(e) 3-(p-chloro-phenyl)-7a-phenyl-2,3,7,7a-tetrahydro-pyrrolo[2,1-b]thiazol-5(6H)-one.

EXAMPLE 7

19.2 parts of 4-benzoyl-butyric acid, 8 parts of 2-amino-ethane thiol and 200 parts of chlorobenzene are heated for 1 hour while distilling off water and chlorobenzene. The remaining chlorobenzene is removed in vacuo, the residue is dissolved in hot ethyl acetate and cooled whereupon 8a-phenyl-hexahydro-5H-thiazolo[3,2-a]pyridin-5-one of the formula

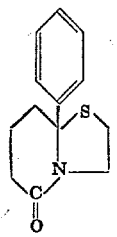

crystallizes out. In pure form, it melts at 110°. This compound can be alternatively named as 8a-phenyl-2,3,6,7,8,8a-hexahydro-5H-thiazolo[3,2-a]pyridin-5-one.

The following compounds are obtained in a similar way:

(a) 7,7-dimethyl-8a-(p-chlorophenyl)-hexahydro-5H-thiazolo[3,2-a]pyridin-5-one, B.P. 152–153.5°/0.08 torr;
(b) 7,7-dimethyl-8a-phenyl-hexahydro-5H-thiazolo[3,2-a]pyridin-5-one, B.P. 135–137.5°/0.08 torr.

EXAMPLE 8

19.2 parts of 4-benzoyl-butyric acid and 9.1 parts of 3-amino-1-propane thiol are heated for 3 hours at 170°. The reaction mixture is extracted with ethyl acetate and ligroin and, after clarifying, the solutions are concentrated, whereupon the 9a-phenyl-hexahydro-2H,6H-pyrido[2,1-b][1,3]thiazin-6-one of the formula

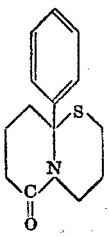

crystallizes out. On recrystallizing from ethyl acetate, it melts at 138°. This compound can be alternatively described as 9a-phenyl-2,3,7,8,9,9a-hexahydro-4H,6H-pyrido[2,1-b][1,3]thiazin-6-one.

EXAMPLE 9

17.8 parts of 3-benzoyl-propionic acid and 9.1 parts of 3-amino-propane thiol are heated for 3 hours at 170°. The residue is then extracted with hot ethyl acetate, the solution is clarified and concentrated, whereupon the 8a-phenyl-tetrahydro-2H-pyrrolo[2,1-b][1,3]thiazin-6(7H)-one of the formula

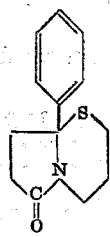

crystallizes out. It is obtained in pure form by recrystallization from cyclohexane. M.P. 122°. This compound can be alternatively described as 8a-phenyl-3,4,6,7,8,8a-hexahydro-2H-pyrrolo[2,1-b][1,3]thiazin-6-one.

EXAMPLE 10

17.8 parts of 3-benzoyl-propionic acid, 13 parts of o-aminobenzene thiol (o-aminothiophenol) and 200 parts of chlorobenzene are heated for 1½ hours in such a way that about half the chlorobenzene distills off with the water formed. The remaining chlorobenzene is evaporated off in vacuo and the residue is dissolved in benzene, ligroin is added and the product is allowed to crystallize out. On recrystallizing from methanol, the pure 3a-phenyl-3,3a-dihydro-pyrrolo[2,1-b]benzothiazol-1(2H)-one of the formula

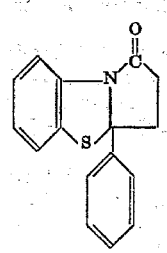

is obtained. M.P. 102. 3a-(p-methoxyphenyl)-3,3a-dihydropyrrolo[2,1-b]benzothiazol-1(2H)-one, M.P. 118°, is produced in an analogous manner.

EXAMPLE 11

34.6 parts of 2-(3'-bromopropyl)-3-hydroxy-3-phenyl-phthalimidine (=2-(3'-bromopropyl)-3-hydroxy-3-phenyl-1-isoindolinone), obtained from N-(3'-bromopropyl)-phthalimide and phenylmagnesium bromide, are dissolved in 1600 parts of glacial acetic acid and 36 parts of 92% sulfuric acid are added. Hydrogen sulfide is then introduced for 24 hours. The yellow solution is poured into 8000 parts of ice water, neutralized with approximately 240 parts of sodium bicarbonate, and the oil which then separates is dissolved in ether. After drying and evaporating, 35 parts of crude 2-(3'-bromopropyl)-3-mercapto-3-phenyl-phthalimidine are obtained.

The crude product is dissolved in 200 parts of isopropyl alcohol in an atmosphere of nitrogen, and a solution of 2.5 parts of sodium in 300 parts of isopropyl alcohol is added. The mixture is boiled for 5 hours, filtered and evaporated in vacuo. The residue is recrystallized twice from ethyl acetate. 10b-phenyl-3,4-dihydro-2H-[1,3]thiazino[2,3-a]isoindol-6(10bH)-one of the formula

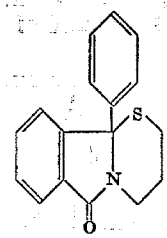

is obtained; it metls at 162–165°.

On using 2-(2'-bromoethyl)-3-hydroxy-3-phenylphthalimidine as starting material, 9b-phenyl-2,3-dihydrothiazolo[2,3-a]isoindol-5((9bH)-one melting at 104–106° is obtained in an analogous manner.

In an analogous manner 10b-(p-methoxyphenyl)-3,4-dihydro-2H-[1,3]thiazino[2,3-a]isoindol-6(10bH)-one-1-oxide, M.P. 180–183°, is obtained from 10b-(p-methoxyphenyl)-3,4-dihydro-2H-[1,3]-thiazino[2,3-a]isoindol-6(10bH)-one.

What is claimed is:
1. A compound of the formula:

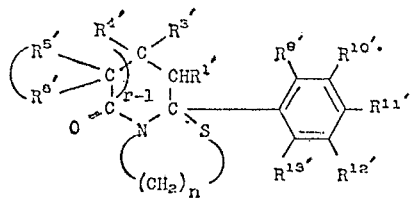

wherein each of $R^{1\prime}$, $R^{3\prime}$, $R^{4\prime}$, $R^{5\prime}$ and $R^{6\prime}$ is hydrogen, lower alkyl or phenyl, there being a maximum of four members of $R^{1\prime}$, $R^{3\prime}$, $R^{4\prime}$, $R^{5\prime}$ and $R^{6\prime}$ other than each of $R^{9\prime}$, $R^{10\prime}$, $R^{11\prime}$, $R^{12\prime}$ and $R^{13\prime}$ is hydrogen chloro, fluoro, lower alkyl, lower alkoxy or trifluoromethyl, at least one of $R^{9\prime}$, $R^{10\prime}$, $R^{11\prime}$, $R^{12\prime}$ and $R^{13\prime}$ being hydrogen, a plurality of trifluoromethyl groups not being bound to adjacent carbon atoms; $r$ is 1 or 2; and $n$ is 2 or 3.

2. A compound of claim 1 wherein $r$ is 1, $n$ is 2 and $R^{1\prime}$, $R^{3\prime}$ and $R^{4\prime}$ are as defined in claim 1.

3. A compound of claim 1 wherein $r$ is 1, $n$ is 3 and $R^{1\prime}$, $R^{3\prime}$ and $R^{4\prime}$ are as defined in claim 1.

4. A compound of claim 1 wherein $r$ is 2 $n$ is 2 and $R^{1\prime}$, $R^{3\prime}$, $R^{4\prime}$, $R^{5\prime}$ and $R^{6\prime}$ are as defined in claim 1.

5. A compound of claim 1 wherein $r$ is 2, $n$ is 3 and $R^{1\prime}$, $R^{3\prime}$, $R^{4\prime}$, $R^{5\prime}$ and $R^{6\prime}$ are as defined in claim 1.

6. 8a - phenyl - 2,3,6,7,8,8a - hexahydro-5H-thiazolo [3,2-a]pyridin-5-one.

7. The compound according to claim 1 which is 6,7a-diphenyl - 2,3,7,7a - tetrahydro-pyrrolo[2,1 - b]thiazol-5(6H)-one.

8. A compound of the formula:

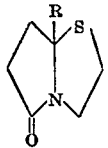

wherein R is phenyl, lower alkylphenyl, fluorophenyl bromophenyl, chlorophenyl, trifluoromtehylphenyl or lower alkoxyphenyl.

9. The compound according to claim 8 wherein R is phenyl, said compound thus being 7a-phenyl-2,3,7,7a-tetrahydro-pyrrolo[2,1-b]thiazol-5(6H)-one.

10. A compound of the formula:

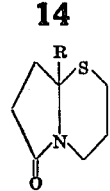

wherein R is phenyl, lower alkylphenyl, fluorophenyl, bromophenyl, chlorophenyl, trifluoromethylphenyl or lower alkoxyphenyl.

11. The compound according to claim 10 wherein R is phenyl, said compound being 8a-phenyl-tetrahydro-2H-pyrrolo[2,1-b][1,3]thiazin-6(7H)-one.

12. A compound of the formula:

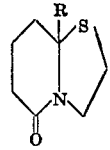

wherein R is phenyl, lower alphylphenyl, fluorophenyl, bromophenyl, chlorophenyl, trifluoromethylphenyl or lower alkoxyphenyl.

13. A compound of the formula:

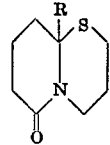

wherein R is phenyl, lower alkylphenyl, fluorophenyl, bromophenyl, chlorophenyl, trifluoromethylphenyl or lower alkoxyphenyl.

14. The compound according to claim 13 wherein R is phenyl, said compound being 9a-phenyl-hexahydro-2H, 6H-pyrido[2,1-b][1,3]thiazin-6-one.

References Cited
UNITED STATES PATENTS

| | | | |
|---|---|---|---|
| 3,334,091 | 8/1967 | Houlihan | 260—243 |
| 3,334,113 | 8/1967 | Houlihan | 260—243 X |
| 3,408,350 | 10/1968 | Houlihan | 260—243 |

JOHN M. FORD, Primary Examiner

U.S. Cl. X.R.

260—306.7, 293.4 E, 558 R, 559 R, 558 S, 558 A, 326.5 S, 293.4 R, 326.5 FL, 294.7 F; 424—246, 270

CASE 4-1928/CIP

PO-1050
(5/69)

UNITED STATES PATENT OFFICE
CERTIFICATE OF CORRECTION

Patent No. 3,646,022          Dated February 29, 1972

Inventor(s)    WILFRIED GRAF ET AL

It is certified that error appears in the above-identified patent and that said Letters Patent are hereby corrected as shown below:

Column 13, line 14, after "than" insert

--- hydrogen; ---; line 45, delete

"trifluoromtehylphenyl" and insert

--- trifluoromethylphenyl ---.

Signed and sealed this 11th day of July 1972.

(SEAL)
Attest:

EDWARD M. FLETCHER, JR.
Attesting Officer

ROBERT GOTTSCHALK
Commissioner of Patents